(No Model.)
G. W. HOSKINS & J. RAY.
CULTIVATOR KNIFE.
No. 393,761. Patented Dec. 4, 1888.
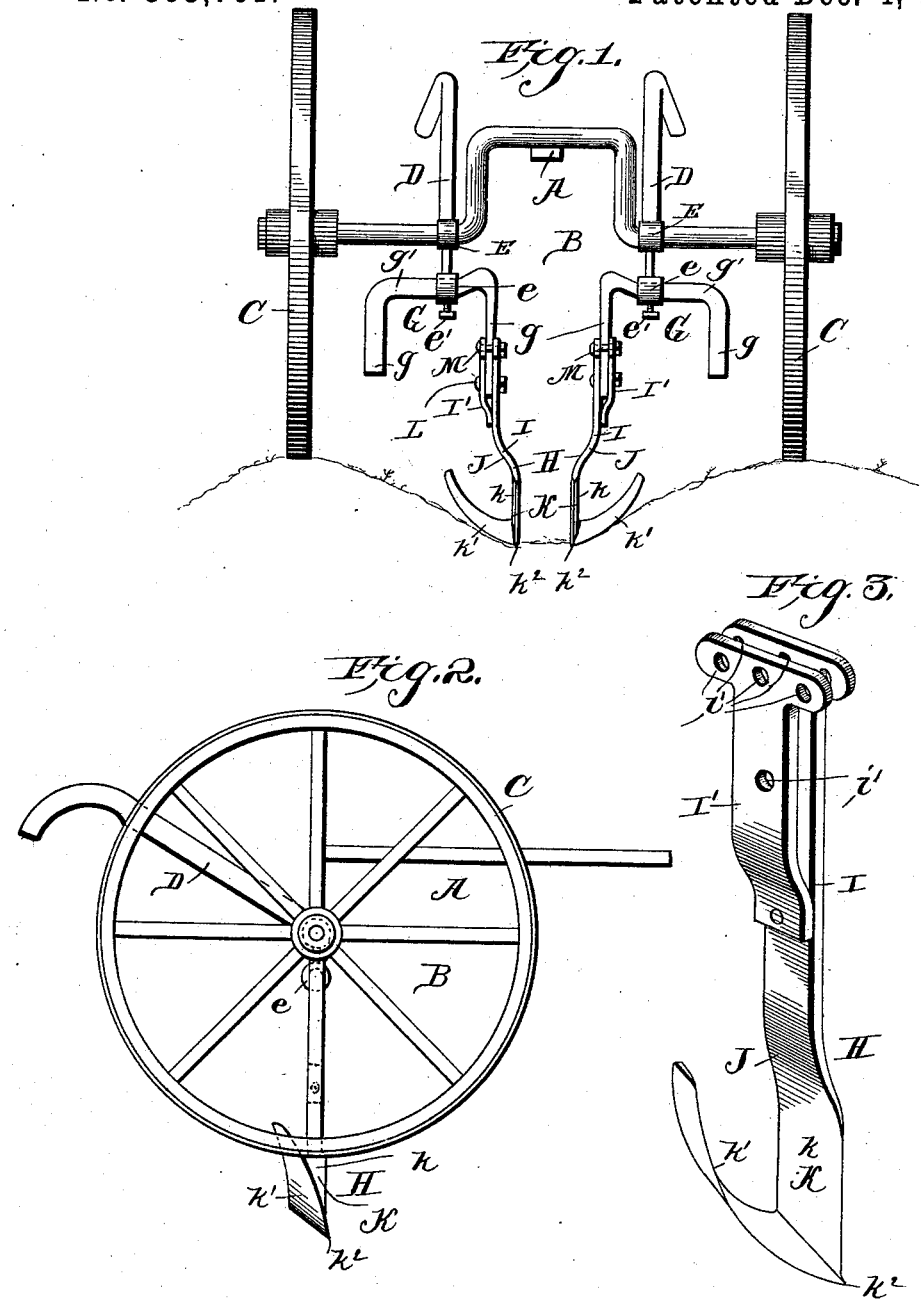
Witnesses:
Henry G. Dieterich
Theodore S. West
Inventor.
George W. Hoskins and
John Ray,
By their Attorneys

UNITED STATES PATENT OFFICE.

GEORGE W. HOSKINS AND JOHN RAY, OF SMITHLAND, IOWA.

CULTIVATOR-KNIFE.

SPECIFICATION forming part of Letters Patent No. 393,761, dated December 4, 1888.

Application filed August 20, 1888. Serial No. 283,230. (No model.)

*To all whom it may concern:*

Be it known that we, GEORGE W. HOSKINS and JOHN RAY, citizens of the United States, residing at Smithland, in the county of Woodbury and State of Iowa, have invented new and useful Improvements in Cultivator-Knives, of which the following is a specification.

The invention relates to improvements in cultivator-knives to be used principally in cultivating listed corn; and it consists in the construction and novel combination of parts, hereinafter described, illustrated in the drawings, and pointed out in the appended claims.

Figure 1 of the drawings represents a front view of a cultivator having cultivator-blades embodying the invention attached. Fig. 2 represents a side view of the same. Fig. 3 is a perspective view of one of the said knives detached, seen from its front or cutting edge.

Referring to the drawings by letter, A designates the beam of a suitable cultivator, and B the axle, which is preferably arched upward centrally, as shown; C C, the conveyer-wheels on said axle; and D D, the handles, all of which are of ordinary construction.

E E are clips embracing the axle on each side of the central arch thereof, and preferably adjustable outwardly upon the same; and *e e* are similar clips depending from and preferably integral with the clips.

G G are yoke-bars having the depending arms *g* and the transverse bars *g'*, which are embraced by the clips *e* and held firmly therein by the set-screws *e''*.

H H are the cultivator-knives, having the bifurcated shanks I and the bends J therein adjoining the blades K and below the bifurcated portions of the shanks. The said bifurcations may be produced by welding or riveting the lower ends of the metal bars I' to the corresponding integral shanks I. The upper end of each shank is extended laterally, forming a head provided with two series of registering adjusting-openings, *i*, in the arms of the bifurcations, below which openings, at a suitable distance, are the registering bolt-openings *i'* in said arms.

The knives are made in pairs, the members of which are right and left, and the bends J extend downward and inward, so that when in position the blades are nearer together than the shanks. The blades K each consist of the vertical portion *k*, extending downward from the bend J, and having a suitable beveled cutting front edge, and the outwardly and upwardly curved portion *k'*, which inclines upward from front to rear, as shown, and the edges of which incline rearward from the vertical portion *k*, and also converge therefrom. The front beveled cutting-edge of curved portion of the blade stands out from the similar edge of the vertical portion *k* at their junction, forming there the rectangular shoulder $k^2$, having a cutting-edge.

The knives are attached to the cultivator on their proper sides by inserting the ends of the facing arms *g* of the yoke-bars between the arms of the bifurcations of the shanks I, passing bolts L through the openings *i'* and registering openings in the ends of the arms *g*, securing said bolts by suitable nuts, and passing a pin, M, through any two registering adjusting openings *i* and a similar opening in the arm. By means of said adjusting-opening and pins the blades can obviously be set at different angles to the soil. The curved portions of the blades stand outward and straddle the rows of corn, the blades cutting into the hills on each side thereof, as shown in the drawings. The shanks, being farther apart than the blades, do not come in contact with and injure the tops of the plants.

We have shown one form of cultivator with our knives attached; but it is obvious that they could be attached to any cultivator having suitable depending arms.

Having thus described our invention, we claim—

1. The combination of the knives having bifurcated shanks and having their blades composed of a vertical portion and an upwardly and outwardly curved portion, the upper ends of the arms of the bifurcation being widened laterally and provided with the openings *i*, the yoke-bars having their lower ends bolted between the arms of the bifurcation, and the pins inserted through aligned openings *i* and the yoke-bars, as set forth.

2. The herein-described cultivator-blades made right and left and each composed of the bifurcated shank I, having the adjusting-openings $i$, bolt-openings $i'$, and bends J, and the blades K, consisting of the vertical portion $k$ and curved portion $k'$, forming between them the shoulder $k^2$, substantially as specified.

In testimony that we claim the foregoing as our own we have hereto affixed our signatures in presence of two witnesses.

GEORGE W. HOSKINS.
JOHN RAY.

Witnesses:
M. A. CLARK,
E. D. FOSTER.